United States Patent
Shivji

(10) Patent No.: US 10,836,191 B2
(45) Date of Patent: Nov. 17, 2020

(54) CONTROLLING PRINTING PRESS SPEED BASED ON SPEED CONTROL REQUESTS

(71) Applicant: Hewlett-Packard Development Company, L.P., Spring, TX (US)

(72) Inventor: Shane Shivji, Corvallis, OR (US)

(73) Assignee: Hewlett-Packard Development Company, L.P., Spring, TX (US)

(*) Notice: Subject to any disclaimer, the term of this patent is extended or adjusted under 35 U.S.C. 154(b) by 0 days.

(21) Appl. No.: 16/612,856

(22) PCT Filed: Jul. 13, 2017

(86) PCT No.: PCT/US2017/041892
§ 371 (c)(1),
(2) Date: Nov. 12, 2019

(87) PCT Pub. No.: WO2019/001796
PCT Pub. Date: Jan. 17, 2019

(65) Prior Publication Data
US 2020/0139735 A1    May 7, 2020

(51) Int. Cl.
*B41J 29/38* (2006.01)
(52) U.S. Cl.
CPC .................. *B41J 29/38* (2013.01)
(58) Field of Classification Search
CPC ..... G03G 15/6564; G03G 2215/00945; G03G 2215/00949; G03G 15/6529; G03G 2215/00556; G03G 2215/00746; B41J 11/42; B41J 29/38; B41J 29/393; H04N 1/00567; H04N 1/00652
See application file for complete search history.

(56) References Cited

U.S. PATENT DOCUMENTS

| | | | |
|---|---|---|---|
| 6,762,855 B1 | 7/2004 | Goldbert et al. | |
| 7,835,021 B2 | 11/2010 | Varga | |
| 8,231,287 B2* | 7/2012 | Burger | G03G 15/6564 400/76 |
| 2005/0183598 A1* | 8/2005 | Johnson | B41F 31/004 101/423 |
| 2010/0037792 A1 | 2/2010 | Burgess et al. | |
| 2013/0063765 A1 | 3/2013 | Lax et al. | |

FOREIGN PATENT DOCUMENTS

EP    1847886 A1    10/2007
WO    WO-2005082625 A1    9/2005

OTHER PUBLICATIONS

Deshpande, A. V. et al., Development of an Inkjet Carriage Motion Controller for Dynamic Print Mode Control, Dec. 9-11, 2002,< http://web.itu.edu.tr/kamasak/pubs/pdf/124.pdf>.

* cited by examiner

*Primary Examiner* — Huan H Tran
(74) *Attorney, Agent, or Firm* — HP Inc. Patent Department

(57) ABSTRACT

A technique includes receiving a plurality of speed control requests from a plurality of components of a processing pipeline for a printing press system. The technique includes controlling the speed of the printing press system based on the plurality of speed control requests.

15 Claims, 5 Drawing Sheets

CONTROLLING PRINTING PRESS SPEED BASED ON SPEED CONTROL REQUESTS

BACKGROUND

A commercial printing press system may contain a data processing pipeline, which transforms document description data (data described in a portable document file (PDF), for example) into raster image data. The raster image data represents raster images for pages of the document to be printed. In general, a raster image is a bit map, which defines a grid of pixels or pixel cells of a document page and defines colors or continuous tones for the pixels/pixel cells.

A printing press system may be sized to meet a customer's printing criteria. In this manner, the "size" of the printing press system generally refers to the extent of resources of the printing press system to handle print jobs, such as computing resources, memory buffer sizes, hard disk storage space, and so forth.

DETAILED DESCRIPTION

Figure 1:
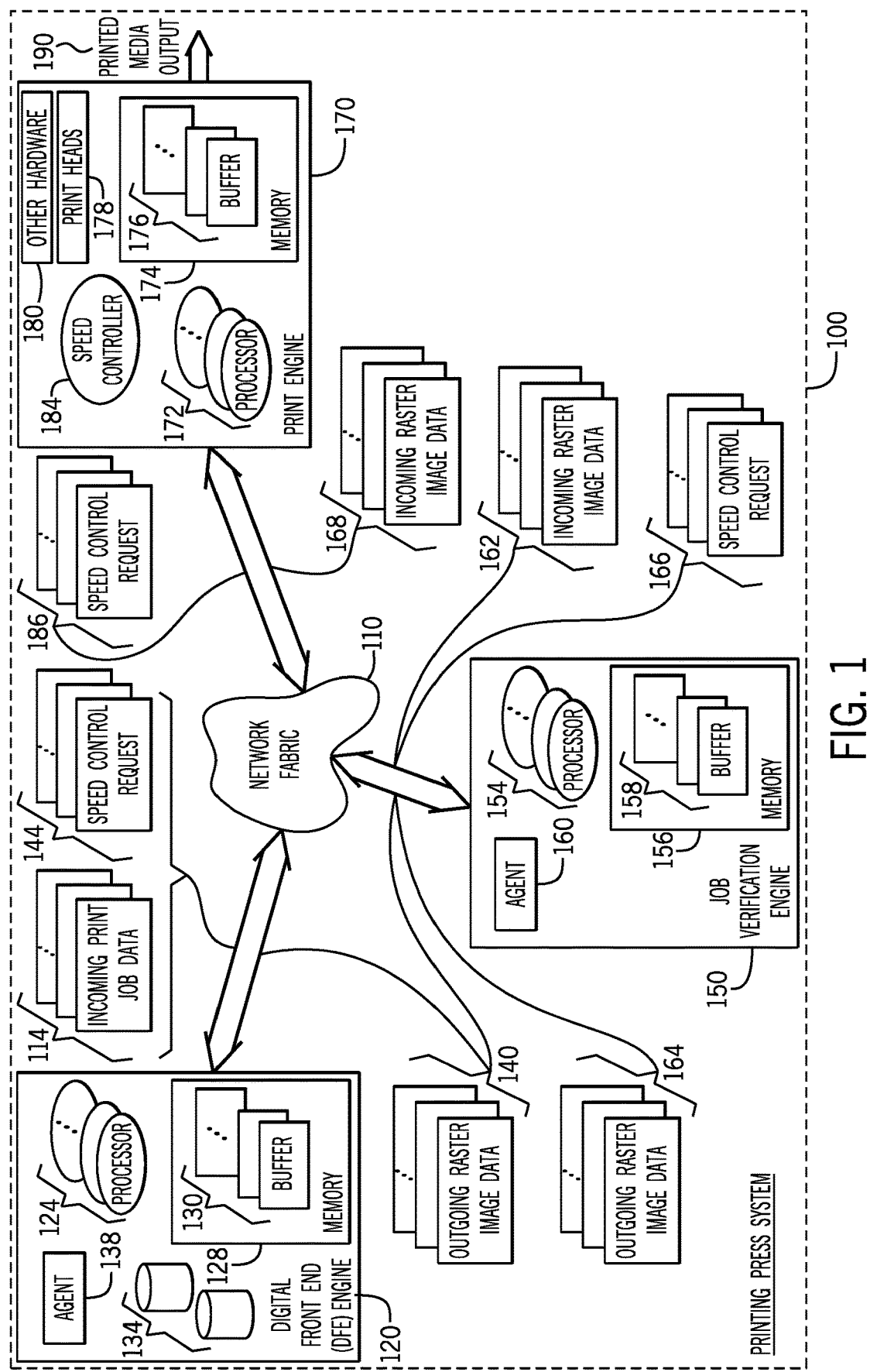
FIG. 1 is a schematic diagram of a printing press system according to example implementations.

One way to size a printing press system to meet a customer's printing criteria is to size the system such that the system has sufficient resources (computing resources, memory space for buffers, hard disk storage space, and so forth) to accommodate the most complex print job that the customer is expected to run through the printing press system. This ensures that the stream of data for the most complex print job keeps up with the speed of the printing press.

In this manner, the printing press system may have a print engine that controls a group of printheads that produce the printed media for the printing press system. The "speed" of the printing press system refers to the speed at which the system produces the printed media. In general, the printing press system has a data processing pipeline, which may rely on storage and memory buffers for purposes of temporarily storing data that is processed through the pipeline. In general, the data processing pipeline transforms print job data into raster image data that controls the printheads of the printing press.

More specifically, the data processing pipeline may include, at an upstream end, a raster image processor, or digital front end (DFE), which receives data representing one or multiple print jobs to be processed by the digital printing press. For example, a given print job may be associated with printing a book, a brochure, an advertisement, and so forth. In general, a print job may be described by one or multiple files, such as one or multiple portable document files (PDFs). The DFE processes the document description files to generate corresponding raster image data for the document pages to be printed. The DFE may temporarily store the produced raster image data in non-volatile storage, such as a hard disk drive-based storage system and/or a storage system formed from non-volatile memory devices. Moreover, the DFE may contain one or multiple memory buffers, for purposes of storing the incoming document description files and communicating the raster image data to the next stage of the data processing pipeline.

The data processing pipeline may also include other processing components, such as, for example, a verification engine, which may, for example, verify the sizes of the print jobs and determine the compatibility of queued print jobs. In this manner, being "compatible" refers to the printing press system being in a state to print the jobs, without the settings of the printing press system being changed. As such, the verification engine may reorder print jobs (and thus, reorder the corresponding raster image data) for purposes of grouping together compatible print jobs to be processed by the printing press system. The verification engine may include one or multiple memory buffers for purposes of storing the incoming raster image data, temporarily storing the incoming raster data, storing data involved in the verification/compatibility processing, temporarily storing raster image data communicated downstream in the data processing pipeline, and so forth.

The data processing pipeline may further include a print engine for the printing press system. In general, the print engine contains the printheads and other hardware for forming the printed media output for the printing press system. The print engine may include, for example, a controller that decompresses the incoming raster image data to form corresponding decompressed raster image data to control the printheads. Moreover, the print engine may contain one or multiple memory buffers for purposes of temporarily storing the compressed, incoming raster image data and storing the decompressed raster image data.

The print engine may be a variable speed engine, in that the print engine controller may control the speed based on the status of one or multiple buffers of the print engine. In this manner, if the buffers remain relatively full, the print engine may increase the print speed, and correspondingly, if the buffers become depleted past a certain level, the print engine controller may decrease the print engine speed.

For a given customer, the resources of the printing press system may be sized to accommodate the most complex print job that the customer is expected to run through the system. This ensures that the stream of data for a relatively complex print job keeps up with the speed of the printing press system. For example, by allocating more memory space (and thus, more memory) and more computing resources for the printing press system, the system may be able to handle relatively more complex print jobs at relatively higher print speeds. If the printing press system is, however, undersized, for a particular print job, the printing press system may have to be stopped during the processing of the print job, resulting in a throwaway job. Sizing the printing press system, however, based on the most complex print job that the system is expected to encounter for a given customer may result in the customer purchasing a system that is oversized for most print jobs that will be processed by the system.

In accordance with example implementations that are described herein, a variable speed printing press system includes a print engine, which receives speed control requests from components (a DFE component, a job verification engine, and so forth) of the system. These components, in turn, may have corresponding buffers and other resources, which are monitored by each of the components for purposes of determining whether the component is able to handle its current processing criteria for the current speed of the printing press system. Based on this assessment, a given component may submit a speed control request to the print engine. As described herein, the print engine may control the printing press speed based on the collective speed control requests that are received by the print engine.

More specifically, in accordance with example implementations, the handling of the speed control request by components of the data processing pipeline may be as follows. In general, a speed control request may be a request that proposes one of the following actions to be taken by the print engine: the print engine increases the print speed; the print engine decreases the print speed; or the print engine maintains the current print speed. If, in accordance with example implementations, any of the components request a decrease in the print speed, the print engine decreases the print speed. Moreover, in accordance with example implementations, if all of the components request a speed increase, then the print engine accordingly increases the print speed. Otherwise, in accordance with example implementations, the print engine does not change the current print speed.

As a more specific example, FIG. 1 depicts a printing press system 100 in accordance with example implementations. The printing press system 100, in general, includes a processing pipeline for purposes of transforming incoming print job data 114 into printed media output 190. In general, the printing press system 100 may take on numerous forms, depending on the particular implementation. For example, in accordance with some implementations, the printing press system 100 may be formed from one or multiple server blades that are mounted to a rack, and communicate over a network fabric 110 for purposes of processing the incoming print job data 114 and forming corresponding outgoing raster image data 168 for a print engine 170 of the printing press system 100. In accordance with further example implementations, however, components of the printing press system 100 may not be located at the same geographical location, but rather, in accordance with some implementations, the printing press system 100 may be formed from components that are distributed across multiple geographic locations. Thus, many implementations are contemplated, which are within the scope of the appended claims.

In accordance with some implementations, the network fabric 110 may be formed from components and use protocols that are associated with any type of communication network such as (as examples) Fiber Channel Networks, iSCSI networks, ATA over Ethernet (AoE) networks, Hyper-SCSI networks, local area networks (LANs), wide area networks (WANs), global networks (the Internet, for example), or any combination thereof.

In general, the incoming print job data 114 may, for example, be submitted via the network fabric 110 by one or multiple print servers (not depicted in FIG. 1). In accordance with some implementations, the incoming print job data 114 is received and processed by a raster image processor, or digital front end (DFE) engine 120. In this manner, the DFE engine 120 may include, for example, one or multiple processors 124 (one or multiple central processing units (CPUs), CPU processing cores and so forth) that execute machine executable instructions, or software, for purposes of processing the incoming print job data 114 to form corresponding outgoing raster image data 140. In general, the DFE engine 120 may include non-volatile storage to temporarily store raster image data before the raster image data is communicated to the network fabric 110. In this manner, in accordance with some implementations, the DFE engine 120 may include one or multiple hard disk drives 134, or other non-volatile memory storage devices, for purposes of temporarily storing the raster image data.

Moreover, in accordance with example implementations, the DFE engine 120 may include one or multiple buffers 130, which are regions created in a memory 128 of the DFE engine 120 for purposes of storing incoming data, data being processed by the DFE engine 120 and outgoing data, such as the raster image data. In this manner, in accordance with example implementations, a given buffer 130 may be defined, for example, by a corresponding allocated memory space of the memory 128. For example, a given buffer 130 may store incoming print job data 114; another buffer 130 may temporarily store raster image data before the data is written to the hard disk drives 134; another buffer 130 may store data being read from the hard disk drives 134; another buffer 130 may temporarily store the outgoing raster image data 140 being furnished to the network fabric 110; and so forth. In general, each buffer 130 has an associated size, and the sizes of the buffers 130 may vary, depending on the particular transmission rates, processing speeds, and so forth, of the components of the DFE engine 120.

In accordance with some implementations, the DFE engine 120 includes an agent 138, which monitors one or multiple buffers 130 of the DFE engine 120 for purposes of assessing the status(es) of the buffer(s) 130. In this manner, in accordance with example implementations, the agent 138 may determine that the buffer(s) being monitored by the agent 138 are continually full or nearly full, and as such, the agent 138 may determine that the print speed of the printing press system 100 may be increased based on the buffer status. Conversely, the agent 138 may determine that one or multiple buffers 130 are being starved or nearly starved (i.e., empty or nearly empty); and as such, the agent 138 may determine that the printing press speed should be decreased. It is noted that the agent 138 may also determine that, based on the buffer levels 138, as well as possibly other criteria, that the current printing press speed is appropriate.

Based on the agent's assessment of the DFE engine's status, the agent 138 may, in accordance with example implementations, submit speed control requests 144 to the print engine 170. In this manner, in accordance with example implementations, the agent 138 may regularly (at designated times, pursuant to a schedule, when a buffer level reaches a predetermined threshold, and so forth) evaluate the status of the DFE engine 120 and submit a corresponding speed control request 144 to the print engine 170. As depicted in FIG. 1, in accordance with some implementations, the DFE engine 120 submits the speed control request 144 via the network fabric 110.

In accordance with some implementations, the memory 128 may be formed from non-transitory storage devices, such as semiconductor storage devices, memristors, phase change memory devices, non-volatile memory devices, volatile memory devices, a combination of one or more of the foregoing memory storage technologies, and so forth.

In accordance with some implementations, the agent 138 may be formed by one or multiple processors 124 executing machine executable instructions (software or firmware, as examples). However, in accordance with further example implementations, the agent 138 may be formed from dedicated hardware, such as one or multiple field programmable gate arrays (FPGAs) or application specific integrated circuits (ASICs), as examples.

The data processing pipeline of the printing press system 100, in accordance with example implementations, may include a job verification engine 150, which receives incoming raster image data 162, from the network fabric 110, such as the raster image data 140 that is provided by the DFE engine 120. In general, the job verification engine may include one or multiple processors 154, as well as a memory 156 in which one or multiple buffers 158 may be allocated. In general, the buffers 158 may be used, for example, for purposes of buffering the incoming raster image data 162 as well as for purposes of buffering outgoing raster image data 164 that is produced by the job verification engine 150. Moreover, in accordance with example implementations, the buffers 158 may include buffers to buffer data being processed by the job verification engine 150.

In accordance with example implementations, the job verification engine 150 may verify the size of print jobs and determine whether certain print jobs are compatible. In this manner, in accordance with some implementations, the job verification engine 150 may order print jobs to ensure that successive compatible print jobs are communicated to the print engine 170 so that settings of the print engine 170 do not have to be changed.

In accordance with example implementations, the job verification engine 150 includes an agent 160, which monitors the status of the job verification engine 150 for purposes of determining whether the print speed should be increased, decreased, or maintained. In this manner, in accordance with some implementations, the agent 160 may, based on its assessment of one or multiple buffer levels of the job verification engine 150, submit corresponding speed control requests 166 (via the network fabric 110) to the print engine 170.

In accordance with example implementations, the memory 156 may be formed from non-transitory storage devices, similar to the memory 128. Moreover, in accordance with some implementations, the agent 160 may be formed by one or multiple processors 154 executing machine executable instructions or may be formed from dedicated hardware.

Thus, in accordance with example implementations, the print engine 170 receives speed control requests 186 that originate from various components of the printing press system 100, such as, for example, the DFE engine 120 and the job verification engine 150. A speed controller 184 of the print engine 170, in accordance with example implementations, correspondingly controls the print speed of the printing press system based on the speed control requests 186. It is noted that the speed controller 184 may take into account criteria other than the speed control requests 186 in determining speed adjustments for the printing press system 100. For example, in accordance with some implementations, the print engine 170 may include one or multiple buffers 176 that are part of a memory 174 of the print engine 170 for purposes of determining any speed adjustments, if any. In this manner, the buffers 176 may temporarily store incoming raster image data 168 for the print engine 170, as well as store other data involved in the processing by the print engine 170.

In accordance with some implementations, the print engine 170 may include one or multiple processors 172 for purposes of decompressing the incoming raster image data 168 to produce corresponding decompressed raster image data, which is used to control the printheads 178 of the print engine 170. Thus, the buffers 176 may, for example, store the incoming raster image data 168, temporarily store decompressed raster image data, and so forth. In accordance with example implementations, the print engine 170 may include other hardware 180, such as media input mechanisms, media output mechanisms, imaging cylinders, and so forth.

In accordance with some implementations, the speed controller 184 may be formed by one or multiple processors 172 executing machine executable instructions, which may be stored, for example, in the memory 174. In general, the memories 174 may be formed from non-transitory storage devices, as described above, for the DFE engine 120.

In accordance with further example implementations, the speed controller 184 may be formed from dedicated hardware circuits, such as FPGAs or ASICs, as examples.

Figure 2:
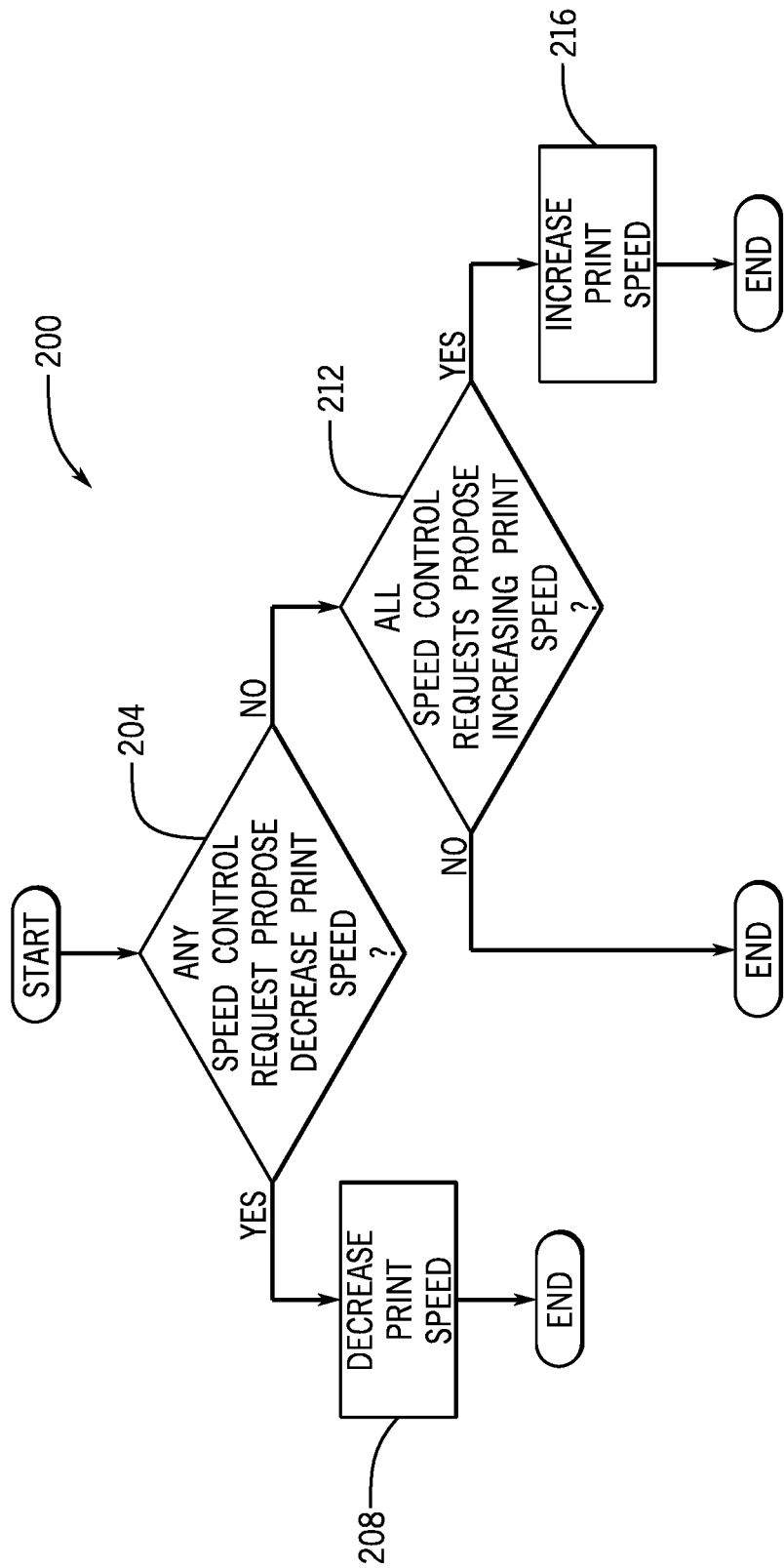
FIG. 2 is a flow diagram depicting a technique used by a speed controller of a print engine of the printing press system of FIG. 1 to control a speed of a print engine based on speed control requests according to an example implementation.

Referring to FIG. 2 in conjunction with FIG. 1, in accordance with some implementations, the speed controller 184 may perform a technique 200 for purposes of evaluating the speed control requests 186. In this manner, the speed controller 184 may perform a technique 200 that includes determining (decision block 204) whether any of the speed control requests propose decreasing the print speed. In accordance with some implementations, if any single speed control request proposes to decrease the print speed, the speed controller 184 decreases the print speed, pursuant to block 208. Otherwise, in accordance with example implementations, the speed controller 184 may determine (decision block 212) whether all of the speed control requests propose increasing the print speed. In this manner, in accordance with some implementations, the speed controller 184 increases the print speed if all of the components of the printing press system 100 request the increase, pursuant to block 216.

In accordance with example implementations, the speed controller 184 may initiate the technique 200 at regular intervals, initiated after a current set of speed requests have been received from all of the components, and so forth, depending on the particular implementation.

Figure 3:
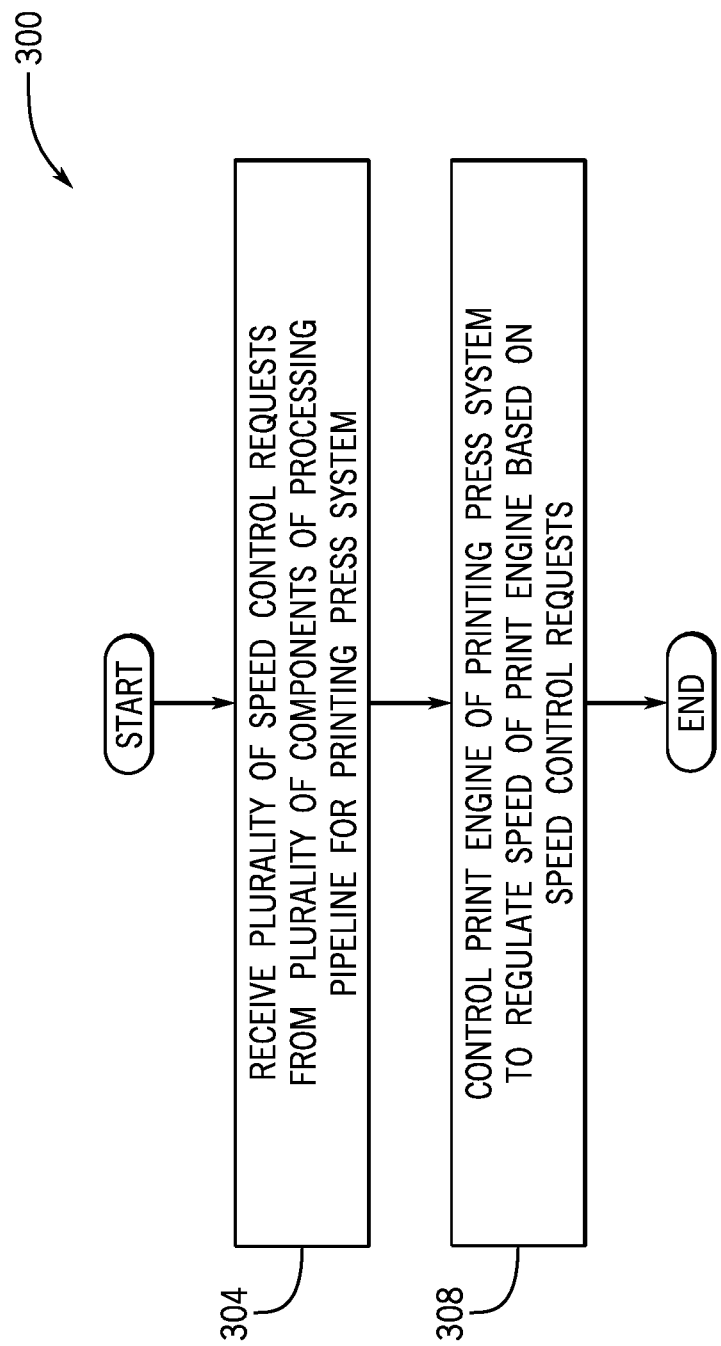
FIGS. 3 and 4 are flow diagrams depicting techniques to control the speed of a printing press system according to example implementations.

Thus, referring to FIG. 3, in accordance with example implementations, a technique 300 includes receiving (block 304) a plurality of speed control requests from a plurality of components of a processing pipeline for a printing press system. The technique 300 includes controlling (block 308) a print engine of the printing press system to regulate a speed of a print engine based on the speed control requests.

Figure 4:
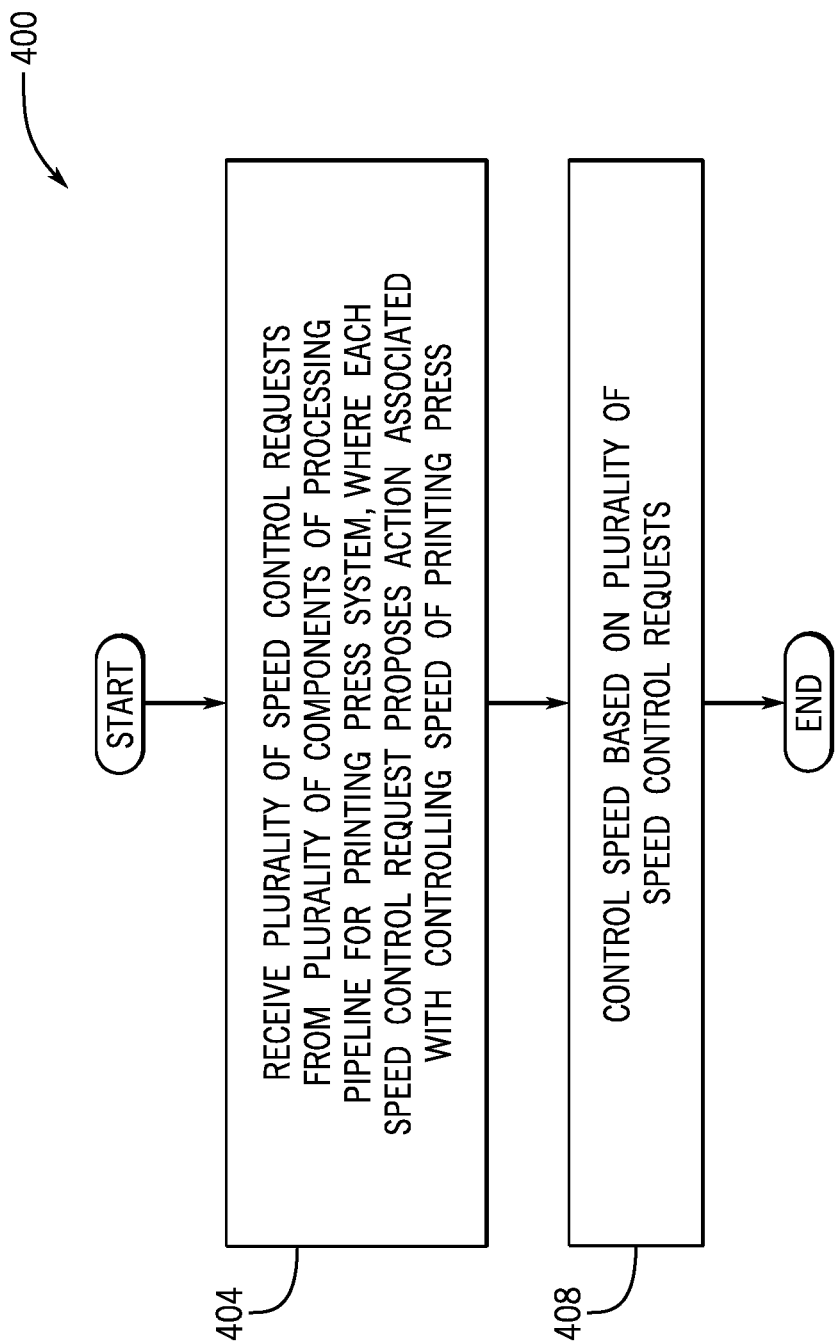

More specifically, referring to FIG. 4, in accordance with example implementations, a technique 400 includes receiving (block 404) a plurality of speed control requests from a plurality of components of a processing pipeline for a printing press system. Each speed control request proposes an action associated with controlling the speed of a printing press. Pursuant to block 408, the speed may then be controlled based on the plurality of speed control requests.

Figure 5:
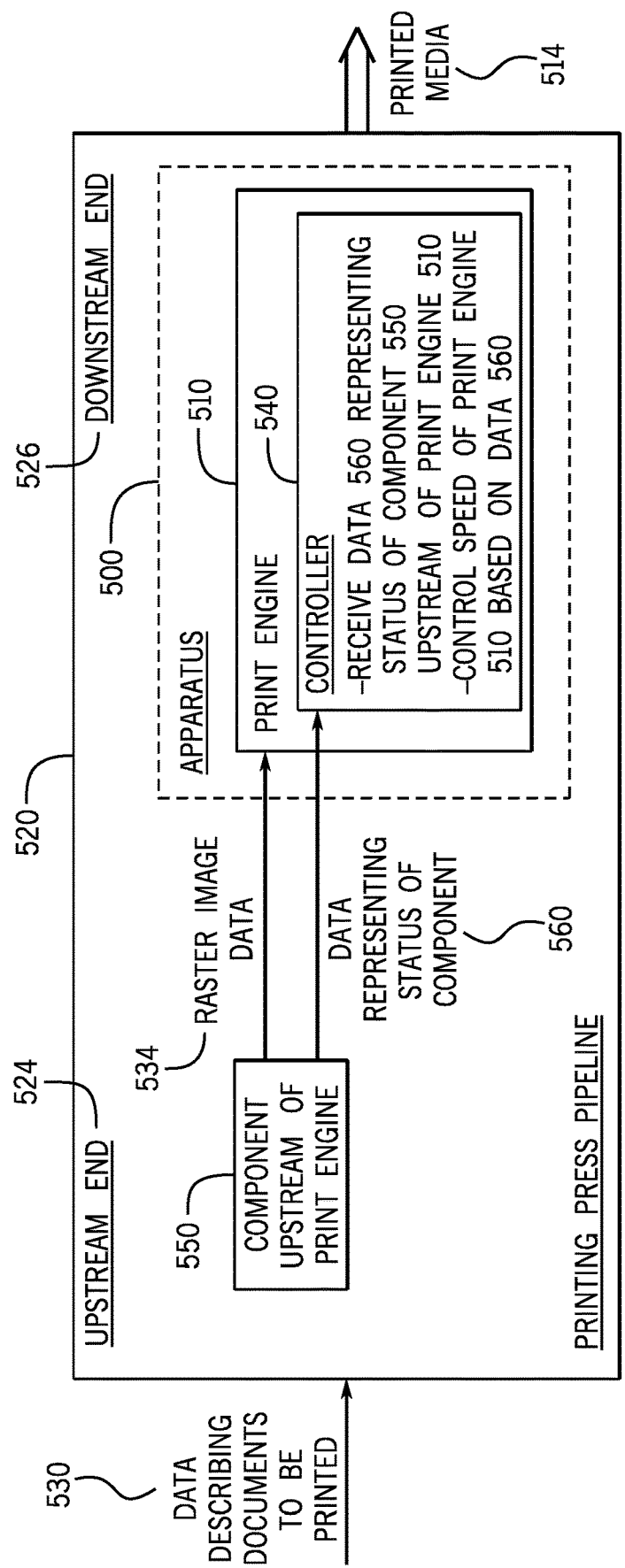
FIG. 5 is a schematic diagram depicting an apparatus to control the speed of a print engine of a printing press pipeline according to an example implementation.

Referring to FIG. 5, in accordance with example implementations, an apparatus 500 includes a print engine 510, which includes a controller 540. The print engine 510 has a variable speed at which the print engine 510 provides printed media 514. The print engine 510 is part of a printing press pipeline 520 that includes an upstream end 524 to receive data 530 that describes documents to be printed. The print engine 510 is disposed at a downstream end 526 of the printing press pipeline 520, and the print engine 510 receives raster image data 534 that is generated in the printing press pipeline 520 upstream of the print engine 510. The controller 510 receives data 560 representing a status of a component 550 of the printing press pipeline 520 upstream of the print engine 510. The controller 510 is to control the speed of the print engine 510 based on the data 560 representing the status of the component 550.

What is claimed is:

1. A method comprising:
receiving a plurality of speed control requests from a plurality of components of a processing pipeline for a printing press system, wherein each speed control request of the plurality of speed control requests proposes an action associated with controlling a speed of the printing press system; and
controlling the speed of the printing press system based on the plurality of speed control requests.

2. The method of claim 1, wherein receiving the plurality of speed control requests comprise receiving one or more of the following requests: a request to slow down the speed of the printing press system, a request to increase the speed of the printing press system, or a request to maintain a current speed of the printing press system.

3. The method of claim 1, wherein controlling the speed of the printing press system comprises:
determining whether any speed control requests proposes decreasing the speed of the printing press system; and
decreasing the speed of the printing press system based on a result of the determination.

4. The method of claim 1, wherein controlling the speed of the printing press system comprises:
determining whether all of the speed control requests propose increasing the speed of the printing press system; and
increasing the speed of the printing press system based on a result of the determination.

5. The method of claim 1, wherein controlling the speed of the printing press system comprises controlling a rate at which the printing press system provides printed media.

6. An apparatus comprising:
a print engine comprising a controller and having a variable speed at which the print engine provides a printed media, wherein the print engine is part of a printing press system pipeline comprising an upstream end to receive data describing documents to be printed, the print engine is disposed at a downstream end of the printing press system pipeline, and the print engine receives raster image data generated in the printing press system pipeline upstream of the print engine; wherein:
the controller to receive data representing a status of a component of the printing press system pipeline upstream of the print engine, and
the controller is to control the speed of the print engine based on the data representing the status of the component.

7. The apparatus of claim 6, wherein the data indicates a state of a buffer of the component.

8. The apparatus of claim 6, wherein the data represents a request provided by the component for an action to be taken by the controller for controlling the speed.

9. The apparatus of claim 8, wherein the request comprises a request to increase the speed, maintain the speed or decrease the speed.

10. The apparatus of claim 6, wherein the component verifies sizes of print jobs associated with the documents and compatibilities of successive print jobs.

11. The apparatus of claim 6, wherein the component comprises a digital front end that generates the raster image data.

12. The apparatus of claim 6, wherein:
the controller to receive additional data representing a status of another component of the printing press system pipeline upstream of the print engine; and
the controller further controls the speed of the print engine based on the additional data.

13. An article comprising a non-transitory machine readable storage medium storing instructions that when executed by a machine cause the machine to:
receive a plurality of speed control requests from a plurality of components of a processing pipeline for a printing press system; and
control a print engine of the printing press system to regulate a speed of the print engine based on the speed control requests.

14. The article of claim 13, wherein the instructions, when executed by the machine, cause the machine to increase the speed of the printing press system in response to the speed control requests representing a consensus of the components to increase the speed.

15. The article of claim 13, wherein the instructions, when executed by the machine, cause the machine to decrease the speed of the printing press system in response to at least one of the speed control requests representing a request to decrease the speed.

* * * * *